United States Patent
West et al.

(10) Patent No.: US 11,705,974 B2
(45) Date of Patent: Jul. 18, 2023

(54) EFFICIENT IN-SITU RADIATIVE LOOP-BACK AESA CALIBRATION AND PROGNOSTIC HEALTH MONITORING

(71) Applicant: Rockwell Collins, Inc., Cedar Rapids, IA (US)

(72) Inventors: James B. West, Cedar Rapids, IA (US); Jeffery A. Finley, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 82 days.

(21) Appl. No.: 17/188,121

(22) Filed: Mar. 1, 2021

(65) Prior Publication Data

US 2021/0376938 A1 Dec. 2, 2021

Related U.S. Application Data

(60) Provisional application No. 63/032,172, filed on May 29, 2020.

(51) Int. Cl.
*H04B 17/12* (2015.01)
*H04B 17/14* (2015.01)
*H04B 17/19* (2015.01)

(52) U.S. Cl.
CPC ............ *H04B 17/12* (2015.01); *H04B 17/14* (2015.01); *H04B 17/19* (2015.01)

(58) Field of Classification Search
CPC ......... H04L 12/28; H04L 12/50; H04W 17/12
USPC ........................................................ 370/329
See application file for complete search history.

(56) References Cited

U.S. PATENT DOCUMENTS

| | | | |
|---|---|---|---|
| 6,084,545 | A | 7/2000 | Lier et al. |
| 8,988,280 | B2 | 3/2015 | Mosca et al. |
| 9,397,766 | B2 | 7/2016 | Puzella et al. |
| 9,409,151 | B1 | 8/2016 | West et al. |
| 9,478,858 | B1 | 10/2016 | West et al. |
| 9,705,611 | B1 | 7/2017 | West |
| 9,923,269 | B1 | 3/2018 | Hageman et al. |
| 10,109,915 | B2 | 10/2018 | Frink et al. |
| 10,263,650 | B2 | 4/2019 | Corman et al. |
| 10,608,756 | B2 | 3/2020 | Jain et al. |

(Continued)

FOREIGN PATENT DOCUMENTS

| | | |
|---|---|---|
| EP | 3497474 A4 | 5/2020 |
| IN | 201947011400 A | 5/2019 |

(Continued)

OTHER PUBLICATIONS

Extended Search Report for European Application No. 21176005.3 dated Oct. 22, 2021, 11 pages.

(Continued)

*Primary Examiner* — Dang T Ton
(74) *Attorney, Agent, or Firm* — Suiter Swantz pc llo

(57) ABSTRACT

A system and method for real-time in-situ calibration of an Active Electronically Scanned Array (AESA) utilizes an S-parameter matrix-based EM transfer function between an end fire, unobtrusive, near field probe radiating element to minimize AESA look angle blockage. A sniffer probe is integrated in the AESA aperture of mechanical mounting frame or embedded with the AESA aperture structure. Hadamard orthogonal coding is utilized to simultaneously energize AESA elements.

15 Claims, 6 Drawing Sheets

(56) References Cited

U.S. PATENT DOCUMENTS 10,615,495 B1     4/2020   Loui
11,131,701 B1 *   9/2021   Mathis ................. G01R 29/105
2015/0349420 A1   12/2015   O'Haver

FOREIGN PATENT DOCUMENTS

IN        201814046601 A    8/2019
KR       102066742 B1     1/2020

OTHER PUBLICATIONS

Silverstein, Seth D: "Application of Orthogonal Codes to the Calibration of Active Phased Array Antennas for Communication Satellites", IEEE Transactions on Signal Processing, IEEE Service Center, New York, NY, US, vol. 45, No. 1, Jan. 1, 1997 (Jan. 1, 1997), XP011057676, ISSN: 1053-587X.

\* cited by examiner

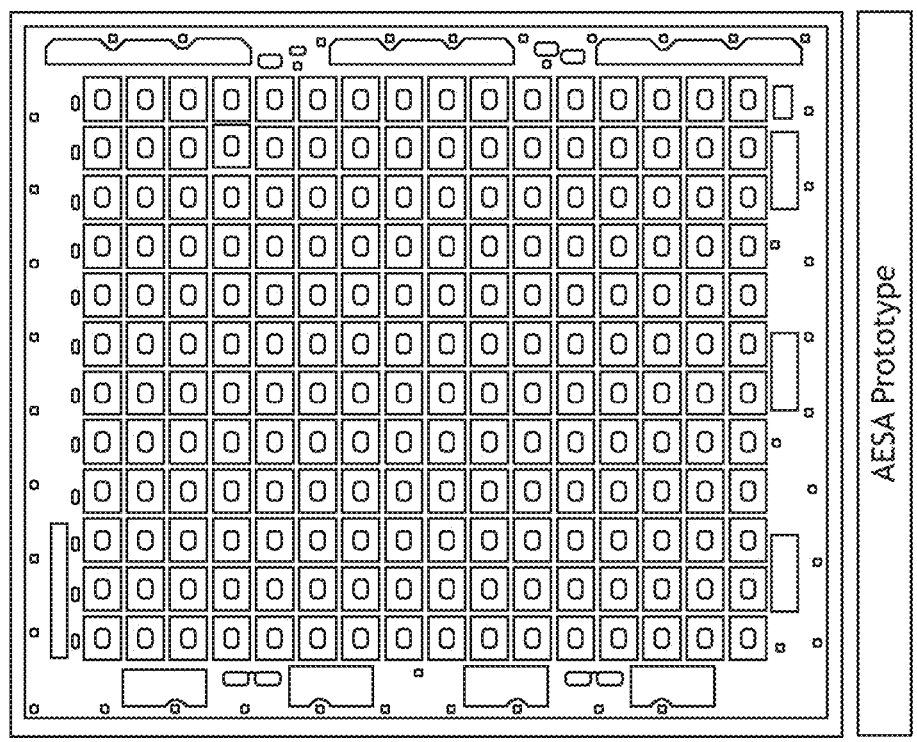

EFFICIENT IN-SITU RADIATIVE LOOP-BACK AESA CALIBRATION AND PROGNOSTIC HEALTH MONITORING

PRIORITY

The present application claims the benefit under 35 U.S.C. § 119(e) of U.S. Provisional App. No. 63/032,172 (filed May 29, 2020), which is incorporated herein by reference.

BACKGROUND

Active Electronically Scanned Arrays (AESAs) require calibration to set gain and phase for each radiating element and commensurate RF channel or subarray for beamforming. Multi-dimensional calibrations are required for some systems parametric with scan volume, frequency, temperature, and desired dynamic pattern shape with respect to gain, side lobe level, null placement, etc. Receive and Transmit channels may require separate calibration. Typically, an initial calibration is performed at the time of manufacture. Depending on system requirements, in-situ re-calibration may be required to account for platform structural features, radome-induced pattern distortions, etc.

AESAs can suffer performance degradation due to environmental factors such as temperature, humidity, altitude, vibration, and indirect lighting; parts failures; and catastrophic and non-catastrophic failures of individual transmit/receive modules, RF and digital electronics, and any associated interconnects.

Field service requirements of avionics products need a time-efficient subarray swap and subsequent re-calibration without the need for expensive measurement facilities when maintained at typical field service centers. Initial calibration and field service generally utilize far-field probes.

Robust in-situ AESA calibration is currently unavailable. It would be advantageous to have a system and method for real-time in-situ diagnostics, prognostics, and compensation for AESA degradation, including determining if compensation is possible to meet minimum performance criteria.

SUMMARY

In one aspect, embodiments of the inventive concepts disclosed herein are directed to a system and method for real-time in-situ calibration of AESAs. The system utilizes an S-parameter matrix-based EM transfer function between an end fire, unobtrusive, near field probe radiating element to minimize AESA look angle blockage. A sniffer probe is integrated in the AESA aperture of mechanical mounting frame or embedded with the AESA aperture structure. Hadamard orthogonal coding is utilized to simultaneously energize AESA elements.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which:

FIG. 2A shows a block diagram of an AESA antenna;

DETAILED DESCRIPTION

Figure 1:
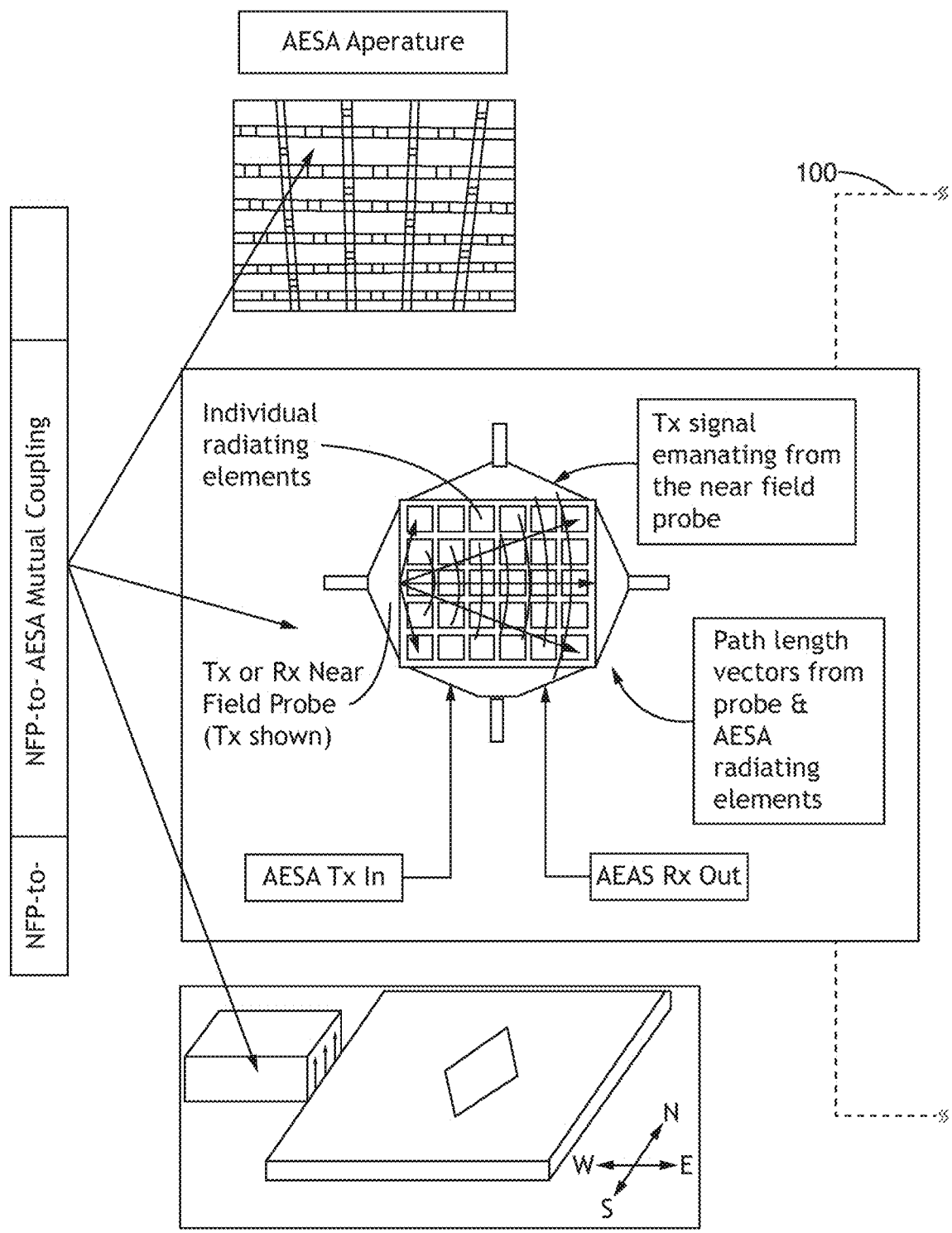
FIG. 1 shows a block diagram of an AESA antenna and calibration circuit according to an exemplary embodiment.
Figure 1:
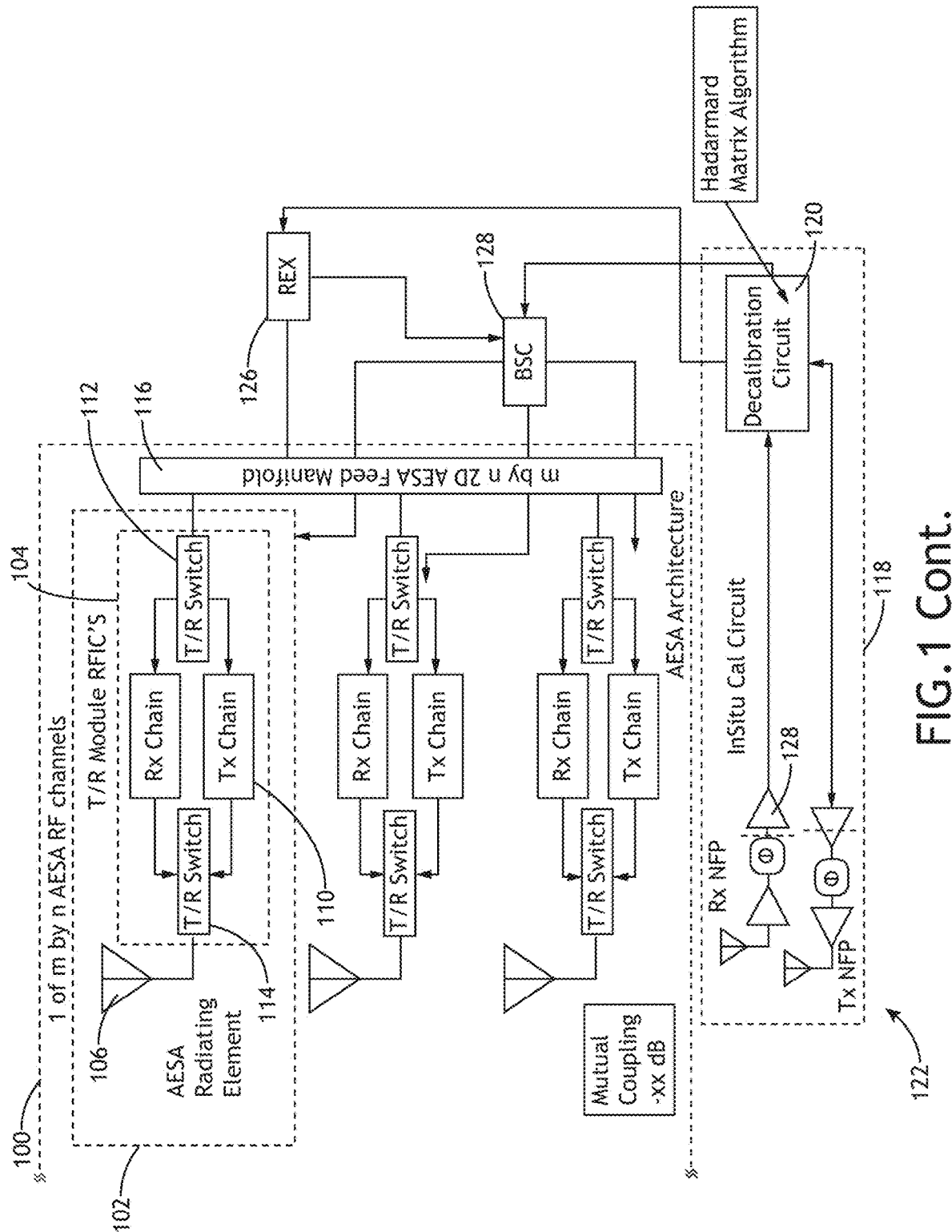

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for real-time in-situ calibration of AESAs. The system utilizes an S-parameter matrix-based EM transfer function between an end fire, unobtrusive, near field probe radiating element to minimize AESA look angle blockage. A sniffer probe is integrated in the AESA aperture of mechanical mounting frame or embedded with the AESA aperture structure. Hadamard orthogonal coding is utilized to simultaneously energize AESA elements.

Referring to FIG. 1, a block diagram of an AESA antenna 100 and calibration circuit 118 according to an exemplary embodiment is shown. The AESA antenna 100 comprises a plurality of radiating elements 102, each comprising a transmit/receive module 104 and a connected radiator 106. The transmit/receive module 104 comprises an input switch 112 that receives signals from a feed layer 116, separate receive channel hardware 108 and transmit channel hardware 110, and an output switch 114. The radiating elements 102 in general and the transmit/receive modules 104 in particular are subject to degradation over time which may impact the efficiently and performance of the AESA antenna 100.

An in-situ calibration element 118 includes a calibration circuit 120 configured to apply a Hadamard orthogonal coding algorithm to simultaneously energize a plurality of radiating elements 102. Receiver and transmitter near-field probe radiating elements 122, 124 minimize AESA look angle blockage. It may be appreciated that the near-field probe radiating elements 122, 124 are distinct from existing far-field probes, and necessitate near-field transfer functions as opposed to far-field transfer functions. In at least one embodiment, S-parameter matrix-based EM transfer functions are utilized. Near-field probe radiating elements 122, 124 provide improved signal-to-noise ratios and data acquisition times. It may be appreciated that while an in-situ calibration element 118 with separate near-field probe radiating elements 122, 124 is shown, a single near-field probe radiating element 122, 124 in a half-duplex configuration may be used. In such configuration, the in-situ calibration element 118 may comprise one or more switches to place the in-situ calibration element 118 in a receive mode or a transmit mode. In at least one embodiment, the in-situ calibration element 118 may be disposed on the AESA antenna 100, or otherwise proximal to the AESA antenna 100 for near-field interaction with the radiating elements 102.

Phase coding utilizes waveform orthogonality between the radiating elements 102 and the near-field probe radiating elements 122, 124 based on Hadamard linear algebra theory. The orthogonality properties of the Hadamard sequence essentially de-correlates RF channels such that they operate as a collection of distinct, uncorrelated and independent RF channels, but while still retaining the aggregate signal-to-noise ratio properties of all radiating elements 102 operating in tandem.

In state-of-the-art calibration systems that utilize Hadamard modulation, each radiating element 102 operates in a far-field radiating mode in an uncorrelated aggregate fashion, while being simultaneously transmitted or received. Existing far-field probes are unsuitable for in-situ diagnostics because they occupy the far-field of each radiating element 102 and the near-field of the aggregate AESA antenna 100, and are therefore too large and obstructive.

The near-field probe radiating elements 122, 124 receive or transmit the uncorrelated RF channel signals. Because the Hadamard modulation sequence is known a priori, the individual RF channel's signals are parsed out of the aggregate received or transmitted aggregate signal. The near-field probe radiating elements 122, 124 are in the near-field of the individual radiating elements 102 in the de-correlated Hadamard modulation scheme. In at least one embodiment, as opposed to mean path length utilized in far-field transfer functions, mutual coupling is measured by the in-situ calibration element 118. Such measurements are used to establish a complex mutual coupling matrix.

In at least one embodiment, a receiver/exciter 126, which may include a controller/processor, receives Hadamard data from the calibration circuit 120 and sends and receives signals to the feed layer 116. The receiver/exciter 126 may be embodied in a radar system. Based on the Hadamard data (which may be embodied in the complex mutual coupling matrix) from the calibration circuit 120, the receiver/exciter 126 may determine a correction factor for one or more radiating elements 102. A beam steering computer 128 connected to the receiver/exciter 126, the calibration circuit 120, and each of the plurality of radiating elements 102 perturbs each of the radiating elements 102 to a desired phase shift according to parameters received from the receiver/exciter 126.

In at least one embodiment, a sniffer probe is embedded with the AESA aperture structure or mechanical mounting frame.

In at least one embodiment, diagnostic, prognostic, re-calibration, and self-healing procedures are available, in-situ, during operation. The in-situ calibration element 118 may be utilized in an interlaced fashion with normal operations to failed or compromised radiating elements 102 and transmit/receive modules 104. Healthy transmit/receive modules 104 may be adjusted to compensate in real-time within some threshold defined by mission specifications.

In at least one embodiment, because the in-situ calibration element 118 is disposed proximal to the AESA antenna 100 and utilizes near-field probe radiating elements 122, 124, re-calibration can be performed within the platform structure and even within a corresponding radome. Parasitic distortions may be identified and compensated for.

When transmit/receive modules 104 fail, partially or catastrophically, far-field radiation performance of the AESA antenna 100 is deteriorated. Healthy radiating elements 102 may be adjusted via signals applied by the feed layer 116 to compensate for the failed transmit/receive modules 104 up to some threshold system performance specification. Radiative loop-back calibration provides ongoing, real-time diagnostic and prognostic functions.

Existing loop-back calibration is typically slow; requiring hundreds or thousands of measurements where only singular transmission and reception elements are measured. Furthermore, existing loop-back calibration offers a poor signal-to-noise ratio because of poor gain where not perpendicular to the aperture.

Periodic built-in self-tests can be performed through mission phasing of, for example, a radar system.

Figure 2B:
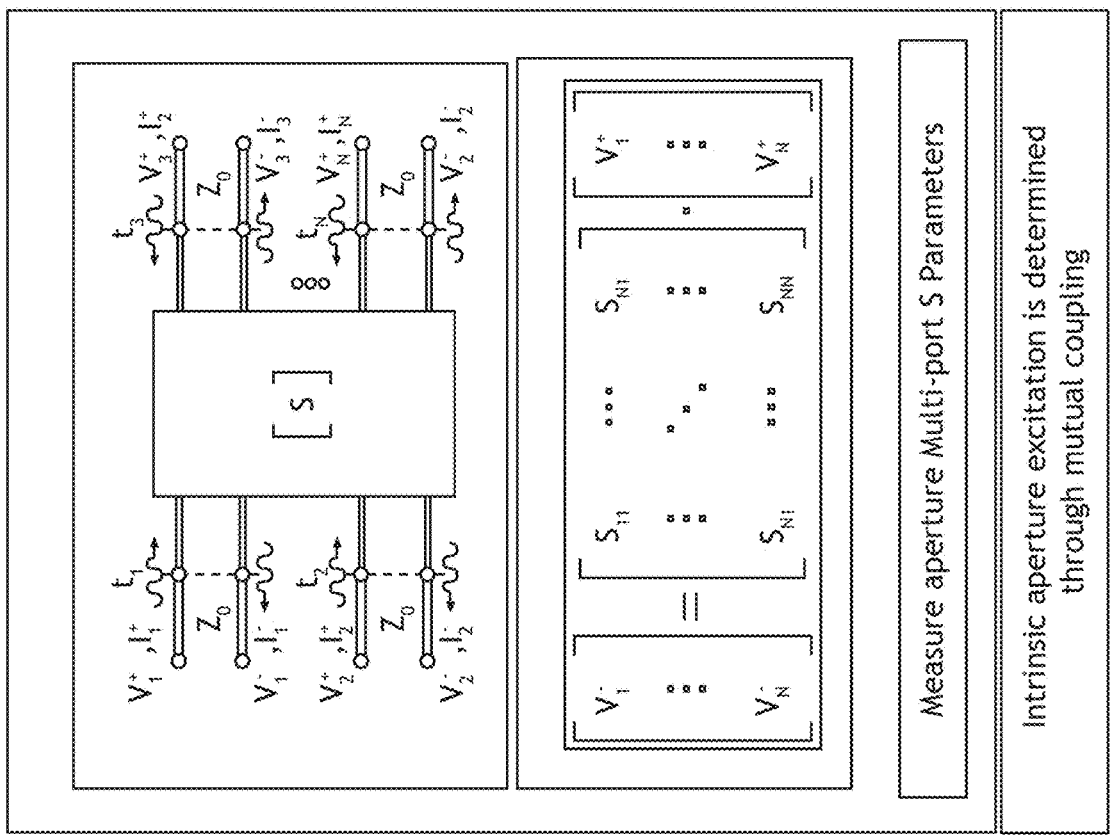
FIG. 2B shows a numerical representation of inter-element coupling.
Figure 2C:
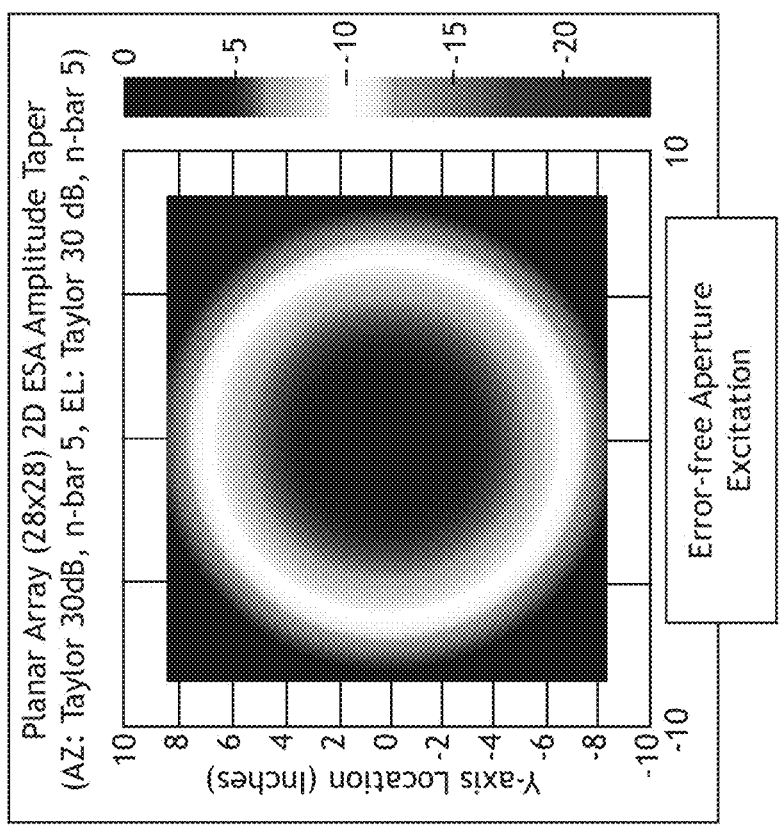
FIG. 2C shows a graphical representation of inter-element coupling.

Referring to FIGS. 2A-2C, graphical, and numerical representations of inter-element coupling are shown. Near-field probe radiating elements may utilize S-parameter matrix-based EM transfer functions. Aperture excitation of an AESA is directly related to the mutual coupling of radiating elements in the array for known multi-port stimuli. The relationship between stimuli and mutual coupling may be simulated and verified through fractional array testing. Such relationships may be represented by an S-parameter or mutual coupling matrix which may be used to derive aperture excitation measurements useful to an a Hadamard orthogonal coding algorithm to identify fault radiating elements in the AESA.

Figure 3:
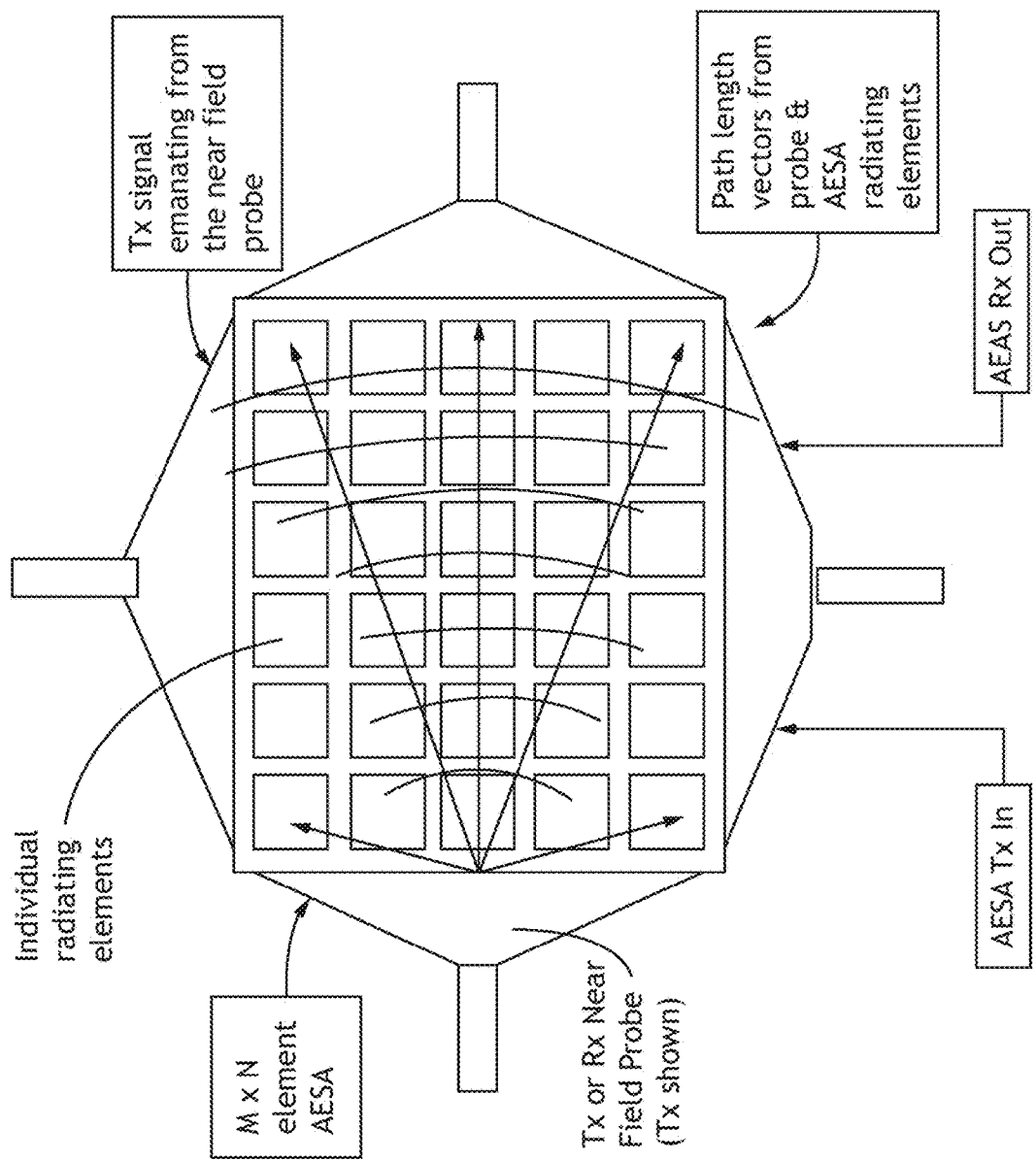
FIG. 3 shows a block representation of an AESA antenna during external RF channel mutual coupling.

Referring to FIG. 3, a block representation of an AESA antenna during external RF channel mutual coupling is shown. A deterministic, polarization sensitive, complex mutual coupling relationship exists between each individual AESA radiating element. Mutual coupling between the AESA radiating elements is influenced by their relative path lengths $r_{m,n}$ and the near-field radiation patterns of the AESA radiating elements. Each Transmit/Receive Module within the AESA can be deactivated and terminate its radiating element into a matched load.

Existing techniques utilizing mutual coupling to evaluate the health of AESA radiating elements are slow, especially for large arrays as more RF channels are used. Other techniques require a far-field probe in a location that may cause parasitic reflection. Embodiments of the present disclosure allow a near-field probe to be placed proximal to the AESA antenna 100; either on the structure or the on the array itself.

Embodiments of the present disclosure are directed to an in-situ built-in self-test, diagnostic, prognostic, re-calibration, and self-healing system that enables electromagnetically benign AESA monitoring by means of radiative loop-back measurements and AESA parameter adjustments as a function of temperature, moisture, etc. The system is a real-time, platform integrated AESA calibration system, with mission-phased compensation for environmental effects and AESA failure modes. A feedback system enhances mean time between failures, repairability, and dispatchability. The system can account for and offset platform structural and radome distortions due to internal reflections. Furthermore, the system may identify when progressive degradation finally reaches a threshold where AESA is no longer suitable for the mission, during execution of the mission.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An apparatus for calibrating an Active Electronically Scanned Array (AESA) comprising:
   at least one near-field transmit probe;
   at least one near-field receive probe; and
   a calibration circuit,
   where:
      the calibration circuit is configured to:
         apply signals to the at least one near-field transmit probe and at least one near-field receive probe, the signals comprising uncorrelated RF channel signals with orthogonal phase coding, and receive measurements from the at least one near-field transmit probe and the at least one near-field receive probe and apply a Hadamard matrix algorithm to the measurements to determine one or more performance metrics; and
         simulate a relationship between stimuli and mutual coupling via fractional array testing.

2. The apparatus of claim 1, wherein:
the calibration circuit is further configured to periodically place the AESA in a diagnostic mode during normal operation; and
the measurements are received periodically during a mission operation.

3. The apparatus of claim 1, wherein:
the calibration circuit is further configured to perform an initial calibration when the AESA is installed in a mobile platform.

4. The apparatus of claim 3, wherein:
the calibration circuit is further configured to identify a distortion due to a radome.

5. The apparatus of claim 1, wherein:
the calibration circuit is further configured to analyze the measurements with respect to an S-parameter matrix.

6. The apparatus of claim 1, wherein:
each of the at least one near-field transmit probe and at least one near-field receive probe comprise end-fire near-field probes configured to minimize look angle blockage.

7. The apparatus of claim 1, wherein:
the apparatus is configured to be disposed within the AESA aperture.

8. The apparatus of claim 1, wherein:
the calibration circuit is further configured to determine an alteration to gain and
phase metrics of one or more radiating elements in the AESA when a faulty transmit/receive module is detected.

9. A system comprising:
an Active Electronically Scanned Array (AESA);
at least one half-duplex near-field probe disposed proximal to the aperture of the AESA; and
a calibration circuit,
where:
   the calibration circuit is configured to:
      apply signals to the at least one near-field transmit probe and at least one near-field receive probe, the signals comprising uncorrelated RF channel signals with orthogonal phase coding, and receive measurements from the at least one half-duplex near-field probe and apply a Hadamard matrix algorithm to the measurements to determine one or more performance metrics; and
      simulate a relationship between stimuli and mutual coupling via fractional array testing.

10. The system of claim 9, wherein:
the calibration circuit is further configured to periodically place the AESA in a diagnostic mode during normal operation; and
the measurements are received periodically during a mission operation.

11. The of claim 9, wherein:
the calibration circuit is further configured to perform an initial calibration when the AESA is installed in a mobile platform.

12. The system of claim 11, wherein:
the calibration circuit is further configured to identify a distortion due to a radome.

13. The system of claim 9, wherein:
the calibration circuit is further configured to analyze the measurements with respect to an electromagnetic field coupling between the at least one halfduplex near-field probe and one or more radiating elements in the AESA.

14. The system of claim 9, wherein:
the at least one half-duplex near-field transmit probe comprises an end-fire nearfield probe configured to minimize look angle blockage.

15. The system of claim 9, wherein:
the calibration circuit is further configured to determine an alteration to gain and
phase metrics of one or more radiating elements in the AESA when a faulty transmit/receive module is detected.

* * * * *